No. 739,707. PATENTED SEPT. 22, 1903.
W. R. PARK.
PIPE COUPLING.
APPLICATION FILED JAN. 5, 1903.
NO MODEL.
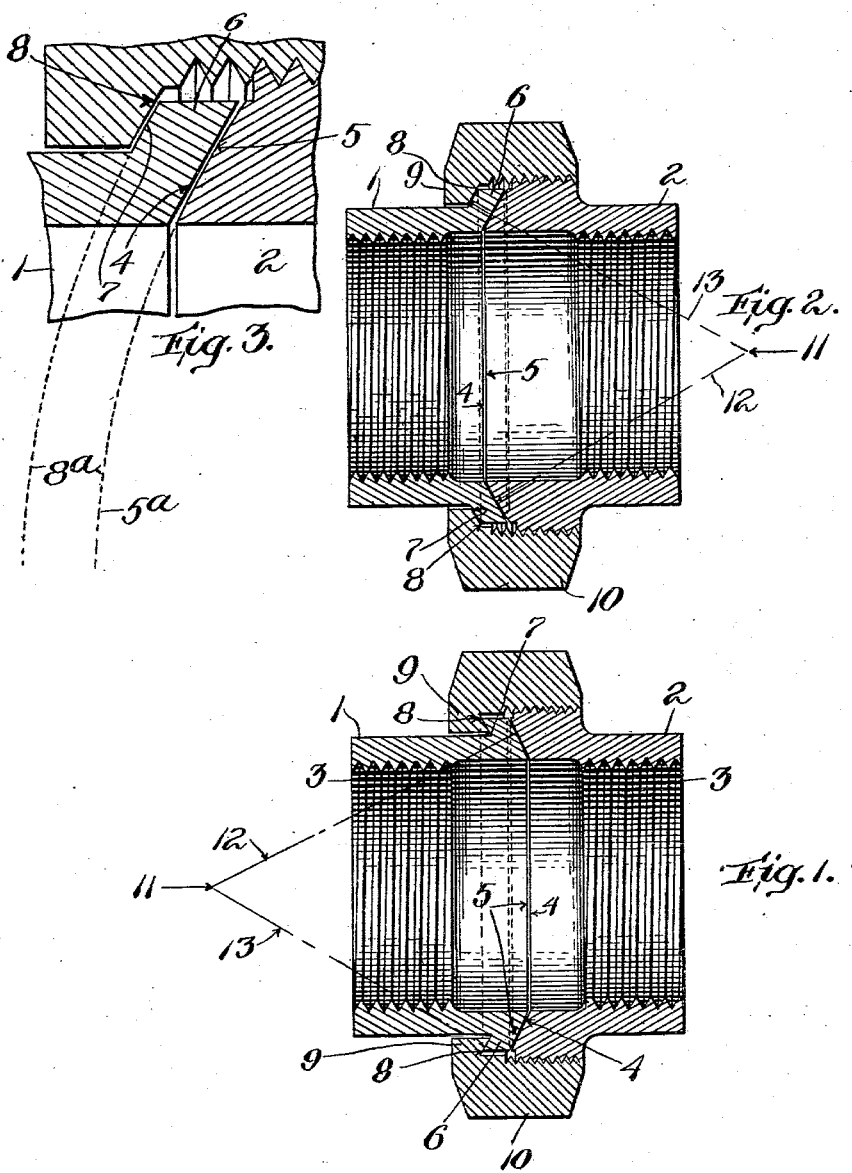
Witnesses:
Arthur L. Randall
Grace E. Gibbons
Inventor:
William R. Park,
by Roberts & Mitchell,
Attorneys.

No. 739,707.

Patented September 22, 1903.

UNITED STATES PATENT OFFICE.

WILLIAM R. PARK, OF TAUNTON, MASSACHUSETTS.

PIPE-COUPLING.

SPECIFICATION forming part of Letters Patent No. 739,707, dated September 22, 1903.

Application filed January 5, 1903. Serial No. 137,787. (No model.)

*To all whom it may concern:*

Be it known that I, WILLIAM R. PARK, a citizen of the United States, and a resident of Taunton, in the county of Bristol and State of Massachusetts, have invented new and useful Improvements in Pipe-Couplings, of which the following is a specification.

My invention relates to pipe-unions, and particularly to pipe-unions of the ball-joint type.

Heretofore pipe-unions of the class to which my invention relates have been made comprising a pipe member made with a concavo-convex flange, both sides of which were spherical and fitted against correspondingly-shaped spherical bearing-surfaces on the other two members of the union. The principal objection to such unions is that the opposed spherical surfaces required to be ground with extreme accuracy in order to fit throughout their entire area and were therefore comparatively expensive to manufacture. Another objection is that the opposed surfaces being of comparatively large area it was difficult and sometimes impossible to bring them into as close relationship as desired.

My invention has for its objects to improve the construction of pipe-unions, and particularly to obviate the above-noted objectionable features of the construction heretofore employed.

In my improved pipe-union one side of the flanged pipe member is spherical and the other side is flatly beveled and contacts on practically a line with an opposed spherical surface on one of the other members of the union. While this is the distinguishing characteristic, yet in the best form of my invention the spherical side of the flange also contacts on practically a line with an opposed flatly-beveled surface on one of the members of the union.

In the accompanying drawings, which serve to illustrate my invention, Figure 1 is a central longitudinal section of a ball-joint union embodying one form of my invention. Fig. 2 is a like view of another form of my invention. Fig. 3 is an enlarged sectional view of a portion of Fig. 2.

Having reference to the drawings, 1 and 2 represent pipe members which are each internally screw-threaded, as at 3, to engage the externally-screw-threaded end of a pipe.

In Fig. 1 the inner end of the pipe member 2 is flatly beveled, as at 4, to receive the spherical inner end 5 of the pipe member 1, as usual, the contiguous surfaces of members 1 and 2 constituting a ball-and-socket joint. The member 1 is made with a flange 6, which differs from the flanges usually provided on such members in that, as shown in Fig. 1, it is flatly beveled, as at 7, to adapt it to meet and engage with a spherical surface 8 on the shoulder 9 of the coupling member or nut 10. The shoulder 9 is so constructed as to coöperate with the surface 7 to provide a ball-and-socket joint between the shoulder 9 and flange 6. The spherical surfaces 5 and 8 are parallel—that is, they are both concentric with the same center, which latter is indicated at the point of the arrow 11, the broken line 12 indicating the radius of the surface 5 and the broken line 13 indicating the radius of the surface 8. The nut 10 is internally screw-threaded, as usual, to engage external screw-threads provided on the pipe member 2.

In Fig. 2 the flat bevel 4 is provided on the flanged member 1, and the inner end of the member 2 is made spherical, as at 5, to fit the flat bevel 4, and when my invention is embodied in this style of pipe-union of course the surface 7 is made spherical and parallel with the inner end of member 2, while the surface 8 of shoulder 9 is merely beveled to make a socket for the spherical surface 8, as will be clear without further description.

In Fig. 3, which is an enlarged sectional detail of a portion of Fig. 2, the dotted lines 5ª and 8ª represent the spherical surfaces 5 and 8 extended and serve to illustrate the curvature and parallelism of said surfaces.

When my improved pipe-union is employed to unite the ends of two pipes which are not in exact alinement, the pipe member 1 is fastened to the end of one pipe, and the pipe member 2 is fastened to the end of the other pipe. The ball-and-socket joint between the members 1 and 2 permits free relative adjustment of said members to a predetermined extent without break in that joint, while the parallelism of the ball-and-socket joint between the flange 6 and nut 10 with the other ball-and-socket joint enables the members 1 and 2 to make perfect joints all around the flange and opposed surfaces, even if said members are carried slightly out of line. Consequently when the nut 10 is screwed up tight and the spherical surface 5 is seated on the bevel 4 the spherical surface 8 will also be seated perfectly on the bevel 7, thus providing perfect joints at each side of flange 6 and preventing leakage. The angle of the bevel 4 on 7 with relation to the axis of the pipes may be varied within reasonable limits, but should bear a proper relationship with the spherical surfaces, which form component parts of the pipe-union. The angle of each beveled surface and the radii of the spherical surfaces should be so related that the circular lines of bearing between the spherical and flat surfaces shall be about midway between the outer and inner boundaries of the said spherical surfaces. I have found that a convenient and serviceable union is made with bevel of about thirty degrees from a plane at right angles to the axis of the pipe-union.

What I claim is—

A pipe-union comprising a pipe member made with a flange spherical on one side and conical on the other; an opposed pipe member and a coupling member, one of the latter made with a conical surface opposed to the spherical side of the flange and the other made with a spherical surface opposed to the conical side of the flange.

Signed by me at Boston, Massachusetts, this 1st day of January, 1903.

WILLIAM R. PARK.

Witnesses:
ARTHUR F. RANDALL,
FRANK S. HARTNETT.